United States Patent [19]

Ueno

[11] Patent Number: 5,456,791
[45] Date of Patent: Oct. 10, 1995

[54] AUTOMATIC WATERPROOFING APPARATUS FOR JOINT OF ELECTRIC WIRES

[75] Inventor: Takashi Ueno, Yokkaichi, Japan

[73] Assignee: Sumitomo Wiring Systems, Ltd., Yokkaichi, Japan

[21] Appl. No.: 298,283

[22] Filed: Aug. 31, 1994

[30] Foreign Application Priority Data

Sep. 22, 1993 [JP] Japan ................... 5-236253

[51] Int. Cl.⁶ ............................... H01B 13/32
[52] U.S. Cl. .................. 156/556; 156/382; 156/423; 156/499; 156/500; 156/522; 156/578; 156/48; 156/49; 264/571; 264/272.13; 264/272.14; 264/272.15; 29/825; 29/841; 29/855; 29/870
[58] Field of Search ................... 156/48, 49, 382, 156/285, 423, 499, 500, 522, 502, 578, 556; 264/571, 272.13, 272.14, 272.15; 29/825, 841, 855, 856, 870

[56] References Cited

U.S. PATENT DOCUMENTS

| | | | |
|---|---|---|---|
| 2,838,797 | 6/1958 | Kolar, Jr. | 264/503 |
| 3,027,627 | 4/1962 | Sturdy | 29/856 |
| 3,608,023 | 9/1971 | Scarborough | 264/102 |
| 4,045,867 | 9/1977 | Ström | 29/856 |
| 4,214,353 | 7/1980 | Kalina | 29/25.42 |
| 4,268,942 | 5/1981 | Meal et al. | 29/25.42 |
| 4,317,278 | 3/1982 | Carmon et al. | 29/878 |
| 4,643,924 | 2/1987 | Uken et al. | 428/35.7 |
| 4,690,831 | 9/1987 | Uken et al. | 427/505 |
| 4,822,434 | 4/1989 | Sawaki et al. | 156/48 |
| 4,849,048 | 7/1989 | Inagaki et al. | 156/275.5 |
| 4,863,535 | 9/1989 | More | 156/49 |
| 5,316,789 | 5/1994 | Ookuma et al. | 427/117 |

FOREIGN PATENT DOCUMENTS

| | | |
|---|---|---|
| 0196219 | 10/1986 | European Pat. Off. ........ C23F 11/00 |
| 0514062 | 11/1992 | European Pat. Off. .......... H01R 4/70 |
| 2624665 | 6/1989 | France .......................... H02G 15/013 |
| 62-200255 | 12/1987 | Japan ............................. H01R 4/70 |
| 63-221507 | 9/1988 | Japan ............................. H01B 7/28 |
| 64-55670 | 4/1989 | Japan ............................. H01R 4/70 |
| 1154473 | 6/1989 | Japan ............................. H01R 4/70 |
| 2108253 | 8/1990 | Japan ............................. H01R 4/72 |
| 2257579 | 10/1990 | Japan ............................. H01R 4/70 |
| 3165475 | 7/1991 | Japan ............................. H01R 43/00 |
| 4229961 | 8/1992 | Japan ............................. H01R 4/70 |
| 5-53188 | 7/1993 | Japan ............................. H01R 43/00 |
| 5-62961 | 8/1993 | Japan ............................. H01R 4/70 |
| 857376 | 12/1960 | United Kingdom . |
| 1335047 | 10/1973 | United Kingdom . |
| 92/19034 | 10/1992 | WIPO ......................... H02G 15/013 |

*Primary Examiner*—Michael W. Ball
*Assistant Examiner*—Francis J. Lorin
*Attorney, Agent, or Firm*—Sandler, Greenblum & Bernstein

[57] ABSTRACT

An automatic waterproofing apparatus for automatically waterproofing a joint of electric wires, comprising: a plurality of pallet jigs each of which is formed with a recess for receiving the joint, a pair of slots for receiving the electric wires and an air vent hole communicating with the recess; a transport device for continuously transporting the pallet jigs; a sheet feeding device for feeding onto an upper face of each pallet jig a flexible band-like sheet; a slit forming device for forming at opposite sides of the sheet a pair of slits corresponding to the slots, respectively; a suction device for sucking air in the recess of each Dallet jig from the air vent hole so as to bring the sheet into close contact with the recess; a joint placing device for placing the joint in the recess and inserting into the slots through the slits the electric wires disposed at opposite sides of the joint; a filler injecting device for injecting a predetermined quantity of filler into the recess; and an adhesive tape bonding device for bonding an adhesive tape to the sheet such that the recess is closed by the adhesive tape.

2 Claims, 5 Drawing Sheets

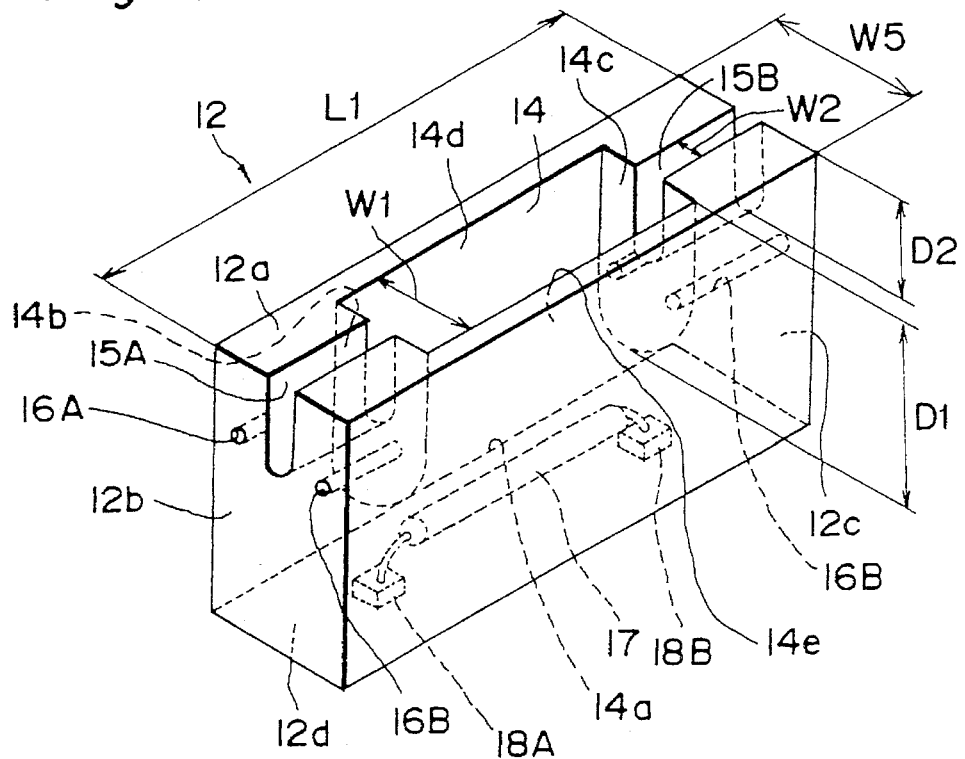
Fig. 3
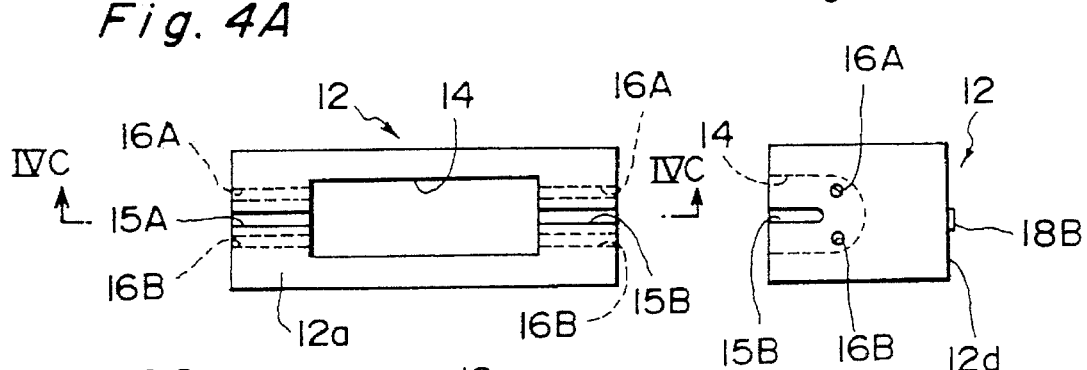
Fig. 4A
Fig. 4B
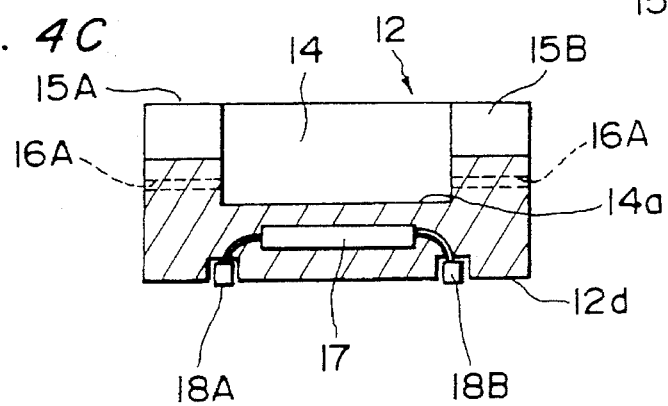
Fig. 4C

AUTOMATIC WATERPROOFING APPARATUS FOR JOINT OF ELECTRIC WIRES

BACKGROUND OF THE INVENTION

The present invention generally relates to an automatic waterproofing apparatus for a joint of electric wires and more particularly, to an automatic waterproofing apparatus for automatically waterproofing a joint of electric wires in a wiring harness used for wiring in a motor vehicle, a motor cycle, a ship, etc.

Various structures for waterproofing a joint of electric wires have been proposed so far. For example, in one known structure for waterproofing a joint of electric wires, an insulating tape is wound around the joint. Meanwhile, in another known structure, a butyl rubber sheet or a butyl rubber tape is wound around the joint of the electric wires and then, external force is applied to the wound sheet or tape.

Meanwhile, as shown in FIG. 1, Japanese Patent Laid-Open Publication No. 2-257579 (1990) proposes a waterproof structure in which when conductors 3 exposed from insulating coatings 1 of electric wires 2A and 2B, respectively, are connected to each other so as to form a joint 4, the joint 4 is covered by an insulating cover 5 and then, urethane elastomer is filled into the insulating cover 5. Furthermore, a waterproof structure in which after a joint of electric wires has been covered by a container formed by vacuum forming or an insulating sheet, silicone resin or ultraviolet-curing resin is injected into the container or the insulating sheet is known from Japanese Patent Laid-Open Publication No. 4-229961 (1992), Japanese Utility Model Laid-Open Publication No. 64-55670 (1989) or Japanese Patent Laid-Open Publication No. 1-154473 (1989).

However, the above mentioned known waterproof structures have the following drawbacks. Initially, in case the insulating tape is wound around the joint of the electric wires, it is difficult to wind the insulating tape around the joint of the electric wires closely without producing a gap between the insulating tape and the joint, thereby resulting in a possibility of incomplete waterproofing. Meanwhile, in case the butyl rubber sheet or the like is wound around the joint of the electric wires and then, external force is applied to the butyl rubber sheet, the butyl rubber sheet cannot follow a bent portion of the wire properly, so that the butyl rubber sheet is not brought into close contact with the joint, thus resulting in a risk of incomplete waterproofing. Furthermore, in case the joint of the electric wires is disposed in the insulating cover or the like and then, urethane elastomer is filled into the insulating cover, the waterproofed joint becomes large in size and thus, it is improper to bundle a plurality of the waterproofed joints by using an adhesive tape or the like.

In addition, all the above mentioned known waterproofing operations should be performed manually by an operator. Therefore, it is difficult to perform the known waterproofing operations automatically by an apparatus or waterproof a number of the joints of the electric wires continuously by the known waterproofing operations.

SUMMARY OF THE INVENTION

Accordingly, an essential object of the present invention is to provide, with a view to eliminating the above described drawbacks inherent in conventional waterproofing of a joint of electric wires, not only automatically waterproofing of the joint but waterproofing the joint excellently without increasing volume of the waterproofed joint.

In order to accomplish this object of the present invention, an automatic waterproofing apparatus for automatically waterproofing a joint of electric wires, according to the present invention comprises: a plurality of pallet jigs each of which is formed with a recess for receiving the joint, a pair of slots for receiving the electric wires and an air vent hole communicating with the recess; the slots being, respectively, formed continuously from opposite ends of the recess; a transport means for continuously transporting the pallet jigs; a sheet feeding means for feeding onto an upper face of each of the pallet jigs a flexible band-like sheet, which is provided upstream of the transport means; a slit forming means for forming at opposite sides of the sheet a pair of slits corresponding to the slots, respectively, which is provided downstream of the sheet feeding means; a suction means for sucking air in the recess of each of the pallet jigs from the air vent hole so as to bring the sheet into close contact with the recess, which is provided downstream of the slit forming means; a joint placing means for placing the joint in the recess and inserting into the slots through the slits of the sheet the electric wires disposed at opposite sides of the joint, which is provided downstream of the suction means; a filler injecting means for injecting a predetermined quantity of filler into the recess, which is provided downstream of the joint placing means; and an adhesive tape bonding means for bonding an adhesive tape to the sheet such that the recess is closed by the adhesive tape, which is provided downstream of the filler injecting means.

Meanwhile, in the present invention, it is preferable that a heating means for heating each of the pallet jigs to a temperature suitable for hardening of the filler is incorporated in each of the pallet jigs.

In the automatic waterproofing apparatus of the above described arrangement of the present invention, the sheet is fed onto the upper face of each of the pallet jigs so as to close the recess and the slots and then, the slits are, respectively, formed at the opposite sides of the sheet. Subsequently, air in the recess of each of the pallet jigs is sucked such that the sheet is brought into close contact with the recess. In this state, not only the joint is placed in the recess but the electric wires disposed at the opposite sides of the joint are inserted into the slots, respectively. Then, after a predetermined quantity of the filler has been injected into the recess, the recess is closed by the adhesive tape.

In case the heating means is incorporated in the pallet jig, the filler injected into the pallet jig can be hardened rapidly.

BRIEF DESCRIPTION OF THE DRAWINGS

This object and features of the present invention will become apparent from the following description taken in conjunction with the preferred embodiment thereof with reference to the accompanying drawings, in which:

FIG. 3 is a schematic perspective view of a pallet jig employed in the automatic waterproofing apparatus of FIG. 2;

FIGS. 4A and 4B are a top plan view and a right side elevational view of the pallet jig of FIG. 3, respectively;

FIG. 4C is a sectional view taken along the line IVC—IVC in FIG. 4A;

Before the description of the present invention proceeds, it is to be noted that like parts are designated by like reference numerals throughout several views of the accompanying drawings.

DETAILED DESCRIPTION OF THE INVENTION

Figure 2:
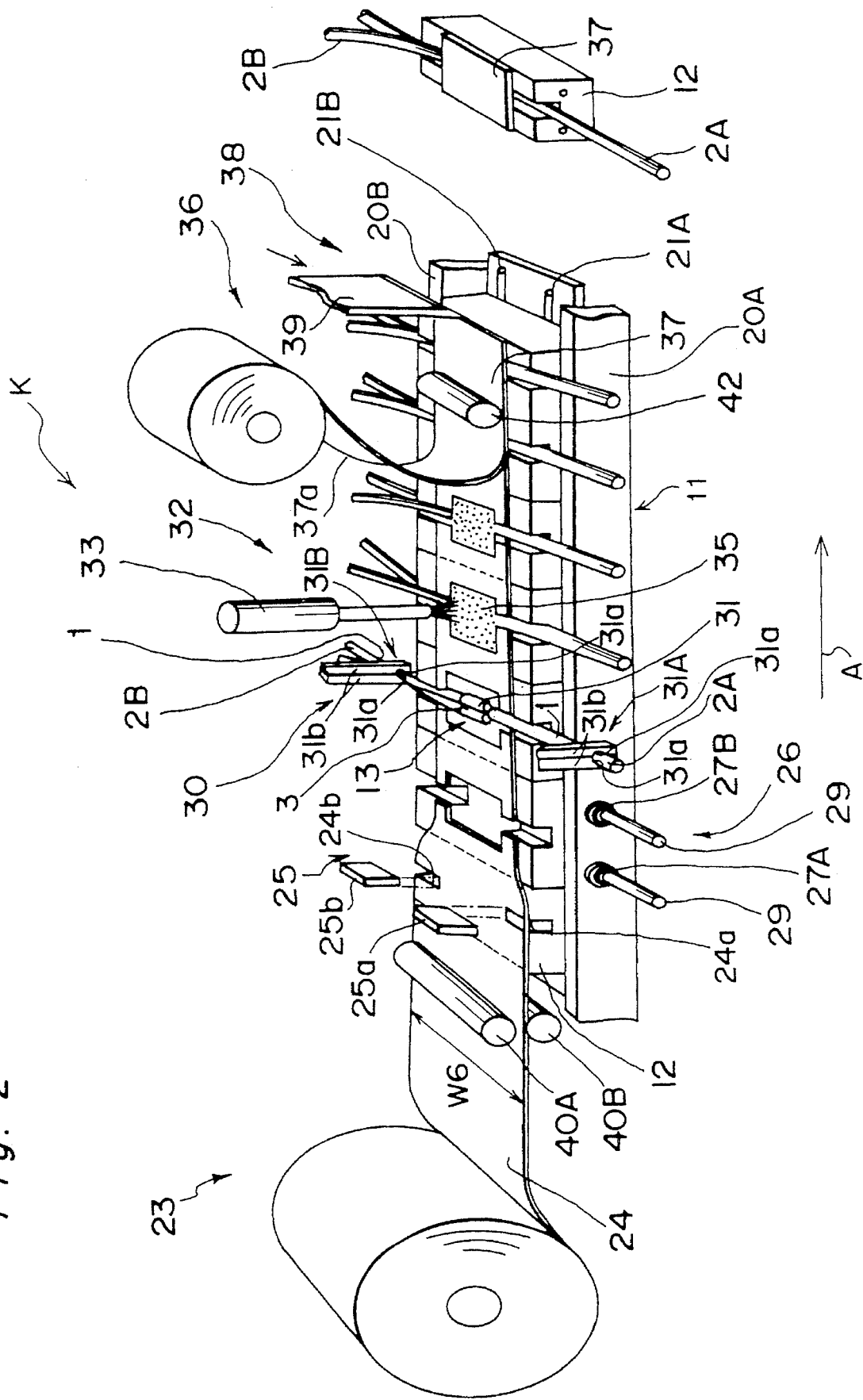
FIG. 2 is a schematic perspective view of an automatic waterproofing apparatus for a joint of electric wires, according to the present invention.

Referring now to the drawings, there is shown in FIG. 2, an automatic waterproofing apparatus K for a joint 13 of electric wires 2A and 2B, according to one embodiment of the present invention. The apparatus K includes a conveyor 11 acting as a transport means. While a plurality of pallet jigs 12 acting as movable forming dies are being continuously transported on the conveyor 11 from an upstream side to a downstream side in the direction of the arrow A, the joint 13 which is disposed in each of the pallet jigs 12 is waterproofed by the apparatus K.

As shown in FIGS. 3 and 4A to 4C, each of the pallet jigs 12 has a shape of a rectangular parallel-piped and a recess 14 for receiving the joint 13 is formed at a central portion of an upper face 12a of the pallet jig 12. Slots 15A and 15B for receiving and retaining the electric wires 2A and 2B are, respectively, formed continuously from opposite ends of the recess 14. The recess 14 has a U-shaped cross section. A width W1 and a depth D1 of the recess 14 are set such that the joint 13 can be sufficiently accommodated in the recess 14. On the other hand, the slots 15A and 15B have a U-shaped cross section in the same manner as the recess 14. A width W2 of the slots 15A and 15B is set to be smaller than the width W1 of the recess 14 such that the electric wires 2A and 2B prior to removal of an insulating coating 1 therefrom can be inserted into the slots 15A and 15B. Meanwhile, a depth D2 of the slots 15A and 15B is set to be smaller than the depth D1 of the recess 14 such that not only the joint 13 is held out of contact with a bottom face 14a of the recess 14 but the joint 13 does not project from the upper face 12a of the pallet jig 12. Meanwhile, a pair of air vent holes 16A and 16B are formed on each of opposite end faces 12b and 12c so as to be communicated with lower portions of the recess 14.

Furthermore, a ceramic heater 17 acting as a heating means is incorporated in the pallet jig 12 so as to be disposed below the recess 14. A pair of power source terminals 18A and 18B for supplying electric current to the ceramic heater 17 protrude slightly out of a bottom face 12d of the pallet jig 12.

Figure 5:
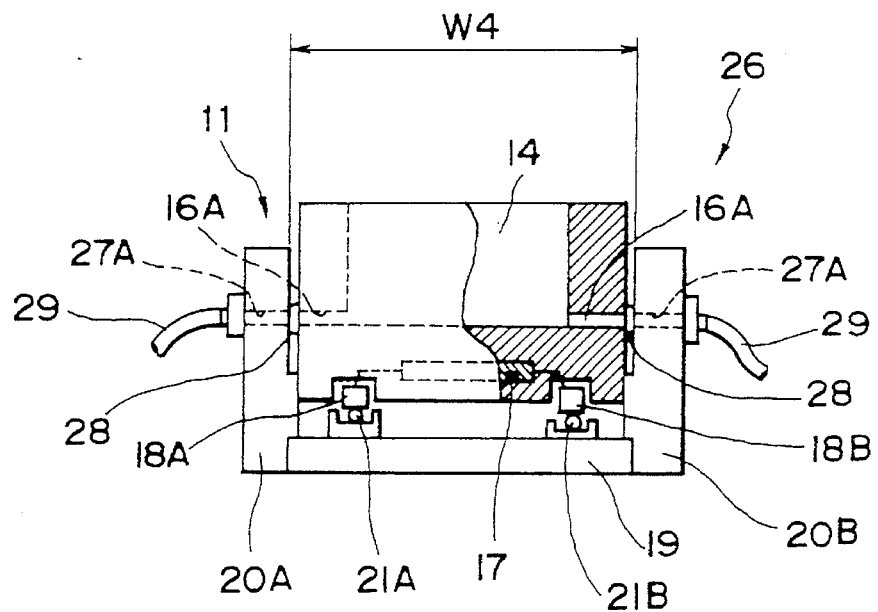
FIG. 5 is a partially broken schematic view of a suction means employed in the automatic waterproofing apparatus of FIG. 2.

As shown in FIG. 5, the conveyor 11 includes a bottom portion 19 and a pair of guide plates 20A and 20B which are provided at opposite sides of the bottom portion 19, respectively. A distance W4 between the guide plates 20A and 20B is set to be larger than a width W5 of the pallet jig 12 such that the pallet jig 12 is displaced on the conveyor 11 straightforwardly. Meanwhile, a pair of power supply rails 21A and 21B are provided on the bottom portion 19 so as to extend in a longitudinal direction of the conveyor 11. A power supply means (not shown) is connected to the power supply rails 21A and 21B so as to supply a predetermined amount of electric current to the power supply rails 21A and 21B at all times. A width between the power supply rails 21A and 21B is set to be equal to that between the power source terminals 18A and 18B of the ceramic heater 17 such that electric current is at all times supplied from the power supply rails 21A and 21B to the ceramic heater 17 of the pallet jig 12 placed on the conveyor 11.

A sheet feeding means 23 for feeding a band-like sheet 24 is provided at an upstream end of the conveyor 11. In the sheet feeding means 23, the sheet 24 wound into a coil is fed by a pair of rolls 40A and 40B driven by a drive means (not shown) so as to be continuously supplied onto the upper face 12a of the pallet jig 12 on the conveyor 11. The sheet 24 is made of comparatively flexible material such as polyethylene and vinyl and a width W6 of the sheet 24 is set to be substantially equal to a length L1 of the pallet jig 12.

A slit forming means 25 is provided downstream of the sheet feeding means 23. The slit forming means 25 includes a pair of punches 25a and 25b which are driven vertically in FIG. 2 by a drive means (not shown). The sheet 24 is blanked by the punches 25a and 25b and the punches 25a and 25b are inserted into the slots 15A and 15B of the pallet jig 12, respectively so as to cut out opposite sides of the sheet 24. As a result, a pair of slits 24a and 24b having a width and a length substantially equal to those of the slots 15A and 15B on the upper face 12a of the pallet jig 12 are formed at the opposite sides of the sheet 24, respectively.

A suction means 26 is provided downstream of the slit forming means 25. As shown in FIG. 5, the suction means 26 includes through-holes 27A and 27B which are formed on each of the guide plates 20A and 20B at positions corresponding to those of the air vent holes 16A and 16B of the pallet jig 12, respectively and an annular sealing member 28 which communicates each of the through-holes 27A and 27B on an inner side face of each of the guide plates 20A and 20B with each of the air vent holes 16A and 16B of the pallet jig 12 hermetically. On an outer side face of each of the guide plates 20A and 20B, one end of a duct 29 is further coupled with each of the through-holes 27A and 27B. Meanwhile, a suction pump (not shown) is connected with the other end of the duct 29.

A joint placing means 30 is provided downstream of the suction means 26. The joint placing means 30 not only places the joint 13 of the electric wires 2A and 2B in the recess 14 of the pallet jig 12 but places in the slots 15A and 15B the electric wires 2A and 2B which have the insulating coatings 1 disposed at opposite sides of the joint 13.

In this embodiment, a conductor 3 of the electric wire 2A is exposed by removing the insulating coating 1 from the electric wire 2A at an intermediate portion of the electric wire 2A, while the conductor 3 of the electric wire 2B is exposed by removing the insulating coating 1 from the electric wire 2B at one end of the electric wire 2B. Then, these conductors 3 of the electric wires 2A and 2B are caulked by a contact bonding terminal 31 and thus, the joint 13 is obtained. The joint 13 may be formed by using a known automatic joint forming apparatus or manually.

The joint placing means 30 includes a pair of clamps 31A and 31B which grip the electric wires 2A and 2B at opposite sides of the joint 13. Each of the clamps 31A and 31B is formed, at its distal end, with a hollow 31a for gripping the electric wires 2A and 2B and includes a pair of arms 31b which are opened and closed about a hinge (not shown) provided at an upper portion in FIG. 2. While gripping the electric wires 2A and 2B at opposite sides of the joint 13 from the automatic joint forming apparatus or the like, the clamps 31A and 31B transport the electric wires 2A and 2B so as to not only place the joint 13 in the recess 14 of the pallet jig 12 but place in the slots 15A and 15B the electric wires 2A and 2B having the insulating coatings 1 at opposite sides of the joint 13.

A filler injecting means 32 is provided downstream of the wire placing means 30 and includes a known meter-dispenser 33. A predetermined quantity of filler 35 is injected into the recess 14 of the pallet jig 12 by the meter-dispenser 33. The filler 35 is electrically insulating resin and is brought into close contact with the joint 13 so as to waterproof the joint 13. The filler 35 may be of any material of which a predetermined amount can be discharged by the meter-dispenser 33, for example, silicone resin, urethane resin, epoxy resin, insulating resinous material to be molten by heating, etc.

An adhesive tape bonding means 36 is provided downstream of the filler injecting means 32. The adhesive tape bonding means 36 includes a press roller 42 for pressing an adhesive tape 37 against the pallet jig 12. The adhesive tape 37 is wound into a coil and has an adhesive layer 37a. The adhesive tape 37 is pressed against the upper face 12a of the pallet jig 12 by the press roller 42 such that the adhesive layer 37a is oriented downwardly. Therefore, the adhesive layer 37a is bonded to the sheet 24. As a result, when the pallet jig 12 is transported rightwards in FIG. 2, the adhesive tape 37 is automatically fed so as to be bonded to the subsequent pallet jig 12.

A cutting means 38 is provided downstream of the adhesive tape bonding means 36. The cutting means 38 is wider than the pallet jig 12 and includes a cutter 39 which is reciprocated vertically in FIG. 2 by a drive means (not shown). The sheet 24 and the adhesive tape 37 are cut at an interval substantially equal to the width W5 of the pallet jig 12 by this cutter 39.

Then, operation of the automatic waterproofing apparatus K of the above described arrangement is described. The pallet jigs 12 are sequentially placed on the conveyor 11 so as to be transported downstream. The power source terminals 18A and 18B of the pallet jig 12 placed on the conveyor 11 are brought into contact with the power supply rails 21A and 21B, respectively, so that the ceramic heater 17 generates heat upon reception of electric current from the power supply rails 21A and 21B so as to heat the pallet jig 12 to a temperature suitable for hardening of the filler 35.

The sheet 24 is supplied by the sheet feeding means 23 to the upper face 12a of the pallet jig 12 placed on the conveyor 11 as described above so as to close the recess 14 and the slots 15A and 15B of the pallet jig 12.

Then, the slits 24a and 24b are, respectively, formed at the opposite sides of the sheet 24 by the slit forming means 25. The width of the slits 24a and 24b is set to be substantially equal to that of the slots 15A and 15B of the pallet jig 12 as described above. Therefore, as diameter of the electric wires 2A and 2B having the joint 13 to be waterproofed becomes larger, the width W2 of the slots 15A and 15B are increased further and thus, the width of the slits 24a and 24b is also increased further.

Figure 6:
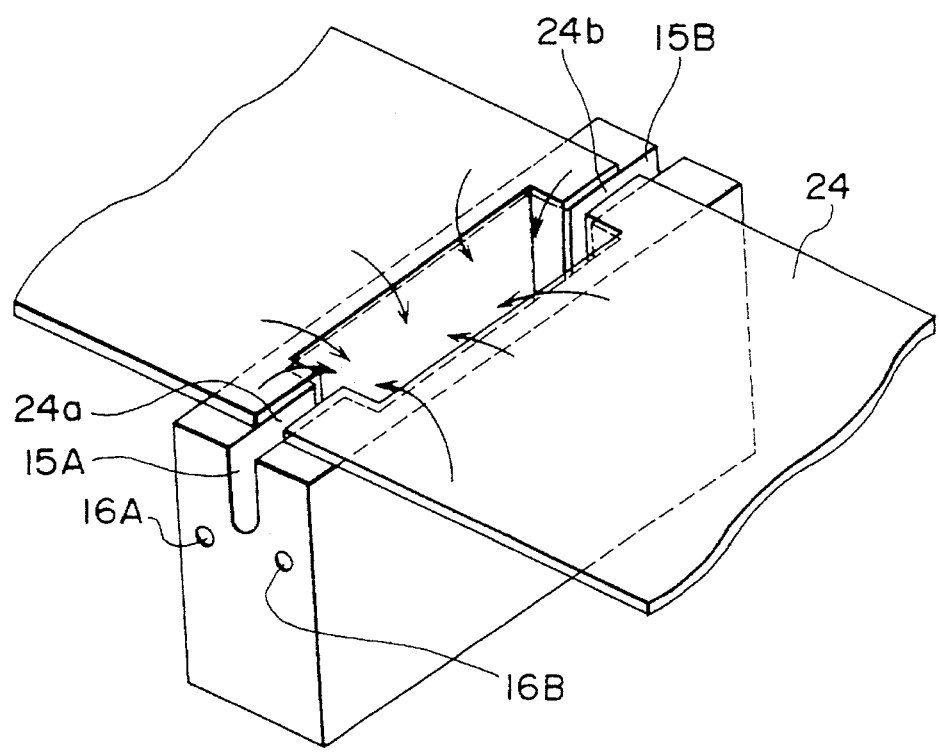
FIG. 6 is a perspective view showing a state in which a band-like sheet is brought into close contact with a recess of the pallet jig of FIG. 3 by the suction means of FIG. 5.

When the pallet jig 12 has been transported to a position where the air vent holes 16A and 16B of the pallet jig 12 confront the sealing members 28 of the suction means 26, respectively, the suction pump of the suction means 26 is driven so as to suck air in the recess 14. At this time, since the sheet 24 closes the recess 14 on the upper face 12a of the pallet jig 12, the sheet 24 is pulled downwardly into the recess 14 as shown in FIG. 6. When air in the recess 14 is further sucked by the suction pump, the sheet 24 is brought into close contact with the bottom face 14a, opposite end faces 14b and 14c and opposite side faces 14d and 14e of the recess 14 as shown in FIG. 6.

At this time, since the sheet 24 has the slits 24a and 24b, the sheet 24 is brought into close contact with the opposite end faces 14b and 14c such that the slits 24a and 24b extend downwardly into the recess 14 along the slots 15A and 15B, respectively as shown in FIG. 6.

Subsequently, the joint 13 is placed by the joint placing means 30 in the recess 14 with which the sheet 24 is brought into close contact. At this time, since the slits 24a and 24b of the sheet 24 extend downwardly into the recess 14 along the slots 15A and 15B, respectively as described above, the electric wires 2A and 2B disposed at the opposite sides of the joint 13 can be positively inserted into and placed in the slots 15A and 15B without being blocked by the sheet 24.

The pallet jig 12 in which the joint 13 has been placed as described above is further transported downstream and the filler 35 is injected into the recess 14 by the meter-dispenser 33 of the filler injecting means 32. At this time, since the pallet jig 12 is heated by the ceramic heater 17 to a temperature suitable for hardening of the filler 35 as described above, the filler 35 injected into the recess 14 is rapidly hardened.

After the filler 35 has been injected into the recess 14, the adhesive tape 37 fed from the adhesive tape bonding means 36 is bonded to the sheet 24 on the upper face 12a of the pallet jig 12 so as to close the recess 14. Since the recess 14 is covered by the adhesive tape 37, the filler 35 is covered by the adhesive tape 37 and the sheet 24 held in close contact with the recess 14. Thus, the pallet jig 12 can be transferred to the next process even if the filler 35 is not hardened completely.

Figure 7:
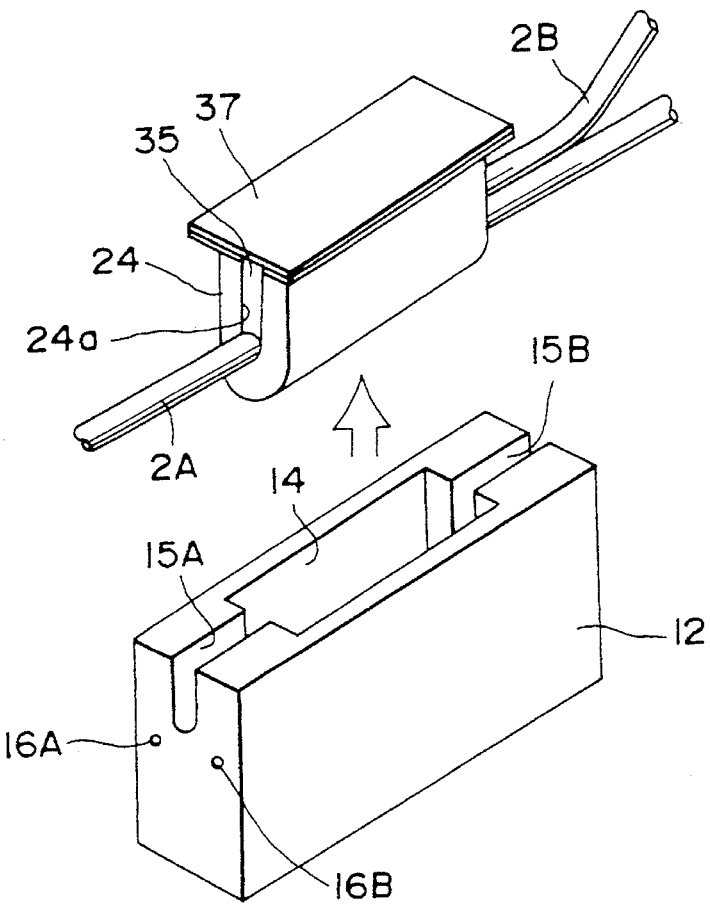
FIG. 7 is a perspective view showing separation of a waterproof structure of the joint waterproofed by the automatic waterproofing apparatus of FIG. 2 from the pallet jig of FIG. 3.

When the pallet jig 12 is carried to the cutting means 38 after the recess 14 has been sealed by the adhesive tape 37, the sheet 24 and the adhesive tape 37 are cut at a left side of the pallet jig 12 in FIG. 2 by the cutter 39 of the cutting means 38. After cutting of the sheet 24 and the adhesive tape 37 has been completed, the pallet jig 12 is removed from the conveyor 11. Then, as shown in FIG. 7, not only the joint 13 covered by the filler 35 is taken out of the recess 14 of the pallet jig 12 but the electric wires 2A and 2B are taken out of the slots 15A and 15B of the pallet jig 12.

The pallet jig 12 from which the joint 13 has been removed as described above is again placed on the conveyor 11 such that the above mentioned processes are repeated.

Thus, a number of the joints of the electric wires can be waterproofed automatically and continuously by the automatic waterproofing apparatus of the present invention.

Figure 1:
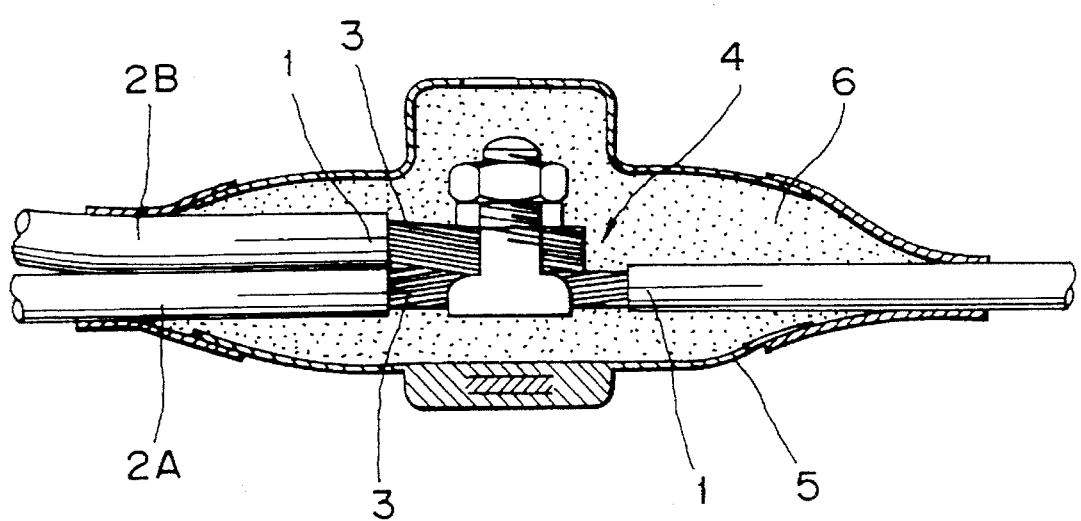
FIG. 1 is a schematic view of a prior art waterproof structure (already referred to)
Figure 8A:
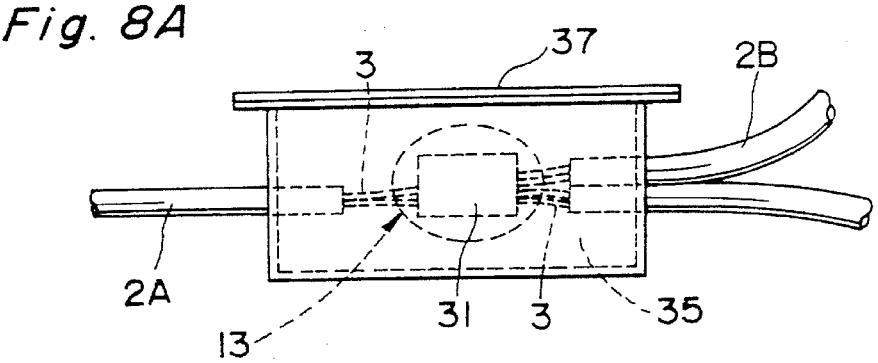
FIGS. 8A and 8B are a front elevational view and a right side elevational view of the waterproof structure of FIG. 7, respectively.
Figure 8B:
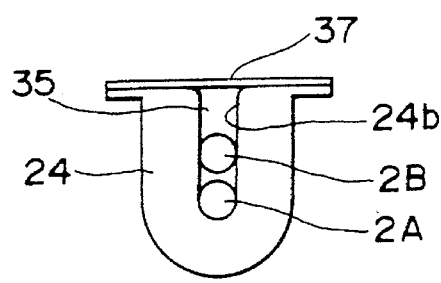

FIGS. 8A and 8B show a waterproof structure of the joint 13 waterproofed by the automatic waterproofing apparatus of the present invention. In this waterproof structure, periphery of the joint 13 is enclosed by the filler 35, while periphery of the filler 35 is enclosed by the sheet 24 and the adhesive tape 37. Therefore, in this waterproof structure, volume of the joint 13 is made small in contrast with a known waterproof structure of FIG. 1 employing a container 5. Accordingly, even when a plurality of the joints 13 are bundled by an adhesive tape or the like, volume of the joints 13 does not become excessively large. Furthermore, in this waterproof structure, periphery of the filler 35 is enclosed by the sheet 24 and the adhesive tape 37. Thus, if the filler 35 is deformable to some extent prior to its complete hardening or after its hardening, projecting portions of a plurality of the joints 13 can be deformed when the joints 13 are bundled by a tape or the like, thereby resulting in a compact wiring harness as a whole.

As is clear from the foregoing description of the automatic waterproofing apparatus of the present invention, while a plurality of the pallet jigs each having the recess and the slots are being transported by the transport means, air in the recess of the pallet jig is sucked from the air vent holes by the suction means so as to bring the sheet into close contact with the recess and then, the joint is placed in the recess. Subsequently, the filler is injected into the recess and then, the adhesive tape is bonded to the sheet so as to close the recess and slots such that the joint is waterproofed. Therefore, a plurality of the joints can be waterproofed automatically and continuously by the automatic waterproofing apparatus of the present invention.

Accordingly, if the automatic waterproofing apparatus of the present invention is employed, even a number of joints of electric wires, e.g., joints of electric wires of a wiring harness used for wiring of a motor vehicle, a motor bicycle, a ship, etc. can be waterproofed efficiently. Especially, if a known automatic connection apparatus for connecting electric wires automatically is combined with the automatic waterproofing apparatus of the present invention, formation of the joints of the electric wires and waterproofing of the joints can be automated completely without the need for performing any manual operation.

Furthermore, in the waterproof structure formed by the automatic waterproofing apparatus of the present invention, the joint is enclosed by the filler and the filler is further enclosed by the sheet and the adhesive tape. Therefore, in this waterproof structure, excellent waterproofing property can be obtained by completely preventing penetration of water into the joint and volume of the joint can be lessened.

Meanwhile, the filler may be deformable to some extent after its hardening. In this case, when the electric wires having the joints are bundled with other electric wires as a wiring harness, the wiring harness as a whole can be made smaller in size by deforming projecting portions of the joints.

In addition, in case the heating means is incorporated in the pallet jig in the automatic waterproofing apparatus of the present invention, hardening of the filler is expedited by heating the pallet jig to a temperature suitable for hardening of the filler, thus resulting in further improvement of operating efficiency.

What is claimed is:

1. An automatic waterproofing apparatus for automatically waterproofing a joint of electric wires, comprising:

a plurality of pallet jigs, each of which is formed with a recess for receiving the joint, a pair of slots for receiving the electric wires and an air vent hole communicating with the recess;

the slots being, respectively, formed continuously from opposite ends of the recess;

a transport means for continuously transporting the pallet jigs;

a sheet feeding means for feeding onto an upper face of each of the pallet jigs a flexible band-line sheet, the sheeting feeding means being provided upstream of the transport means;

a slit forming means for forming at opposite sides of the sheet a pair of slits corresponding to the slots, respectively, the slit forming means being provided downstream of the sheet feeding means;

a suction means for sucking air in the recess of each of the pallet jigs from the air vent hole so as to bring the sheet into close contact with the recess, the suction means being provided downstream of the slit forming means;

a joint placing means for placing the joint in the recess and inserting into the slots through the slits of the sheet the electric wires disposed at opposite sides of the joint, the joint placing means being provided downstream of the suction means;

a filler injecting means for injecting a predetermined quantity of filler into the recess, the filler injecting means being provided downstream of the joint placing means; and an adhesive tape bonding means for bonding an adhesive tape to the sheet such that the recess is closed by the adhesive tape, the adhesive bonding means being provided downstream of the filler injecting means.

2. An automatic waterproofing apparatus as claimed in claim 1, wherein a heating means for heating each of the pallet jigs to a temperature suitable for hardening of the filler is incorporated in each of the pallet jigs.

* * * * *

UNITED STATES PATENT AND TRADEMARK OFFICE
CERTIFICATE OF CORRECTION

PATENT NO. : 5,456,791
DATED : October 10, 1995
INVENTOR(S) : Takashi UENO

It is certified that error appears in the above-indentified patent and that said Letters Patent is hereby corrected as shown below:

On the Title page, in section [57], "ABSTRACT", line 11, change "Dallet" to ---pallet---.
At column 6, line 40, before "held" insert ---is---.
At column 8, line 20 (claim 1, line 13), change "sheeting" to ---sheet---.

Signed and Sealed this

Eleventh Day of June, 1996

Attest:

BRUCE LEHMAN

*Attesting Officer*   Commissioner of Patents and Trademarks